(12) United States Patent
Guo et al.

(10) Patent No.: US 12,476,022 B2
(45) Date of Patent: Nov. 18, 2025

(54) COMBINED CABLE

(71) Applicant: Tyco Electronics (Shanghai) Co., Ltd., Shanghai (CN)

(72) Inventors: Zhiwei (Jack) Guo, Dongguan (CN); Hainan (Harlan) Lu, Dongguan (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/711,657

(22) Filed: Apr. 1, 2022

(65) Prior Publication Data
US 2022/0319736 A1    Oct. 6, 2022

(30) Foreign Application Priority Data
Apr. 1, 2021    (CN) .......................... 202120677646.9

(51) Int. Cl.
*H01B 7/08*    (2006.01)
*H01B 7/02*    (2006.01)
*H01B 9/02*    (2006.01)

(52) U.S. Cl.
CPC ......... *H01B 7/0216* (2013.01); *H01B 7/0241* (2013.01); *H01B 7/08* (2013.01); *H01B 9/023* (2013.01)

(58) Field of Classification Search
CPC .................................. H01B 7/08; H01B 11/04
See application file for complete search history.

(56) References Cited

U.S. PATENT DOCUMENTS

| | | | | |
|---|---|---|---|---|
| 4,185,162 A * | 1/1980 | Bogese, II | ........... | H01B 7/0838 174/32 |
| 6,043,434 A * | 3/2000 | Prudhon | .............. | H01B 7/0823 174/117 F |
| 6,803,518 B2 * | 10/2004 | Chang | .................. | H01B 7/0861 333/1 |
| 8,492,655 B2 * | 7/2013 | Gundel | ................ | H01B 7/0861 174/117 F |
| 8,575,488 B2 * | 11/2013 | Sugiyama | .............. | H01B 11/20 174/105 R |
| 8,946,556 B2 * | 2/2015 | Sunaga | ................ | H01B 11/203 174/102 R |
| 9,355,755 B2 * | 5/2016 | Gundel | .............. | H01B 11/1856 |
| 9,892,823 B2 * | 2/2018 | Gundel | .............. | H01B 11/1891 |
| 10,964,448 B1 * | 3/2021 | Wright | ................... | H01B 3/421 |
| 11,217,918 B2 * | 1/2022 | Vana, Jr. | ................ | H01R 12/62 |
| 2004/0026101 A1 * | 2/2004 | Ochi | ................... | H01B 11/1091 174/36 |
| 2011/0174515 A1 * | 7/2011 | Siahaan | ............... | H01B 7/0823 174/102 R |
| 2012/0090873 A1 * | 4/2012 | Gundel | ................ | H05K 9/0098 174/113 R |

(Continued)

*Primary Examiner* — Chau N Nguyen
(74) *Attorney, Agent, or Firm* — Barley Snyder

(57) ABSTRACT

A combined cable includes at least two cable groups, each comprising at least one cable arranged side by side. Each cable group further comprises an adhesive layer wrapping a periphery of the at least one cable and having adhesion agent located on an outside of the adhesive layer. Each cable group further includes two coating layers, respectively adhered to a periphery of the adhesive layer of each cable group with the adhesion agent from upper and lower sides of the at least two cable groups. The coating layers located between adjacent two cable groups are detachably abutted together.

17 Claims, 2 Drawing Sheets

(56) References Cited

U.S. PATENT DOCUMENTS

| | | | |
|---|---|---|---|
| 2018/0005729 A1* | 1/2018 | Gundel | H01B 11/002 |
| 2018/0075948 A1* | 3/2018 | Kobayashi | H01B 11/20 |
| 2019/0198199 A1* | 6/2019 | Gundel | H01B 11/203 |
| 2020/0219637 A1* | 7/2020 | Ahn | H01B 7/20 |
| 2022/0189660 A1* | 6/2022 | Uegaki | H01B 7/18 |

* cited by examiner

COMBINED CABLE

CROSS-REFERENCE TO RELATED APPLICATIONS

This application claims the benefit of Chinese Patent Application No. CN 202120677646.9 filed on Apr. 1, 2021 in the China National Intellectual Property Administration, the whole disclosure of which is incorporated herein by reference.

FIELD OF THE INVENTION

The present disclosure relates to a combined cable including a row of cables.

BACKGROUND

A flat combined cable according to the prior art generally includes a row of cable groups. Each cable group includes at least one cable arranged side by side. Adhesive tape is adhered to upper and/or lower side surfaces of a row of cable groups. A row of cable groups is connected and secured together by adhesive tapes adhered to the upper and/or lower surfaces thereof.

For a combined cable in which one piece of adhesive tape is adhered to the upper and lower side surfaces of a row of cable groups, respectively, the cost of the combined cable is relatively high, and the stiffness of the combined cable will be too rigid, making bending of the same difficult. This increases the difficulty of soldering the cable to a circuit board.

For a combined cable in which only one adhesive tape is adhered to the upper or lower side surfaces of a row of cable groups, it is easy for the adhesive tape to fall off and or become loose. Further, the hot melt glue of the adhesive tape between two adjacent cable groups is exposed to the air, which is easily affected by the environment and thus fails due to aging.

SUMMARY

According to an embodiment of the present disclosure, a combined cable includes at least two cable groups, each comprising at least one cable arranged side by side. Each cable group further comprises an adhesive layer wrapping a periphery of the at least one cable and having adhesion agent located on an outside of the adhesive layer. Each cable group further includes two coating layers, respectively adhered to a periphery of the adhesive layer of each cable group with the adhesion agent from upper and lower sides of the at least two cable groups. The coating layers located between adjacent two cable groups are detachably abutted together.

BRIEF DESCRIPTION OF THE DRAWINGS

The invention will now be described by way of example with reference to the accompanying Figures, of which.

DETAILED DESCRIPTION OF THE EMBODIMENTS

Figure 1:
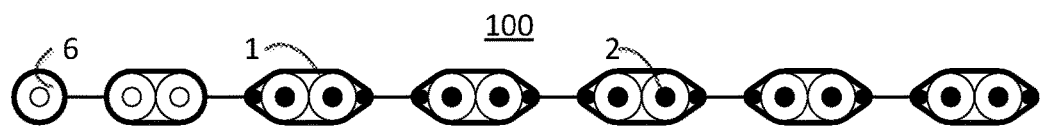
FIG. 1 is a front view of a combined cable according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a combined cable is provided. The combined cable includes at least two cable groups each including at least one cable arranged side by side. Each cable group further includes an adhesive layer wrapping the periphery of the at least one cable and having adhesion agent located on the outside of the adhesive layer. Two coating layers respectively adhered to the periphery of the adhesive layer of each cable group with the adhesion agent from upper and lower sides of the at least two cable groups. The coating layers located between adjacent two cable groups are detachably abutted together.

Figure 2:
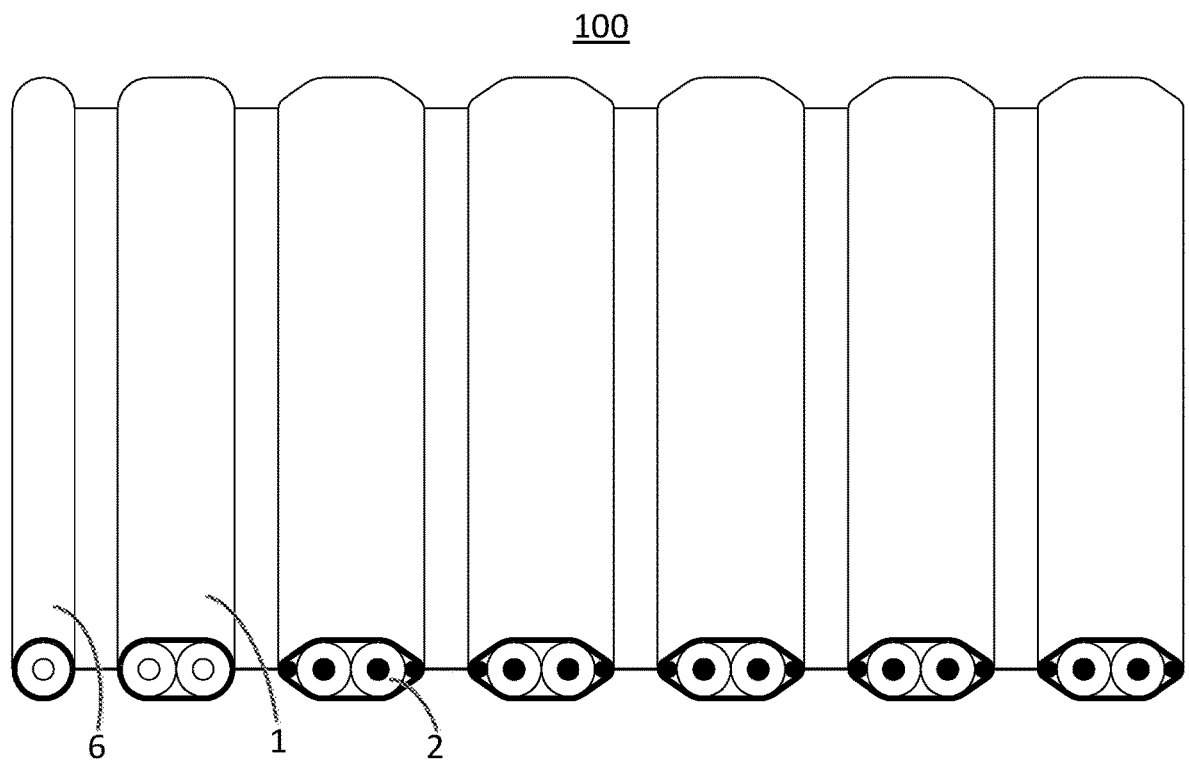
FIG. 2 is a schematic perspective view of the combined cable shown in FIG. 1.
Figure 3:
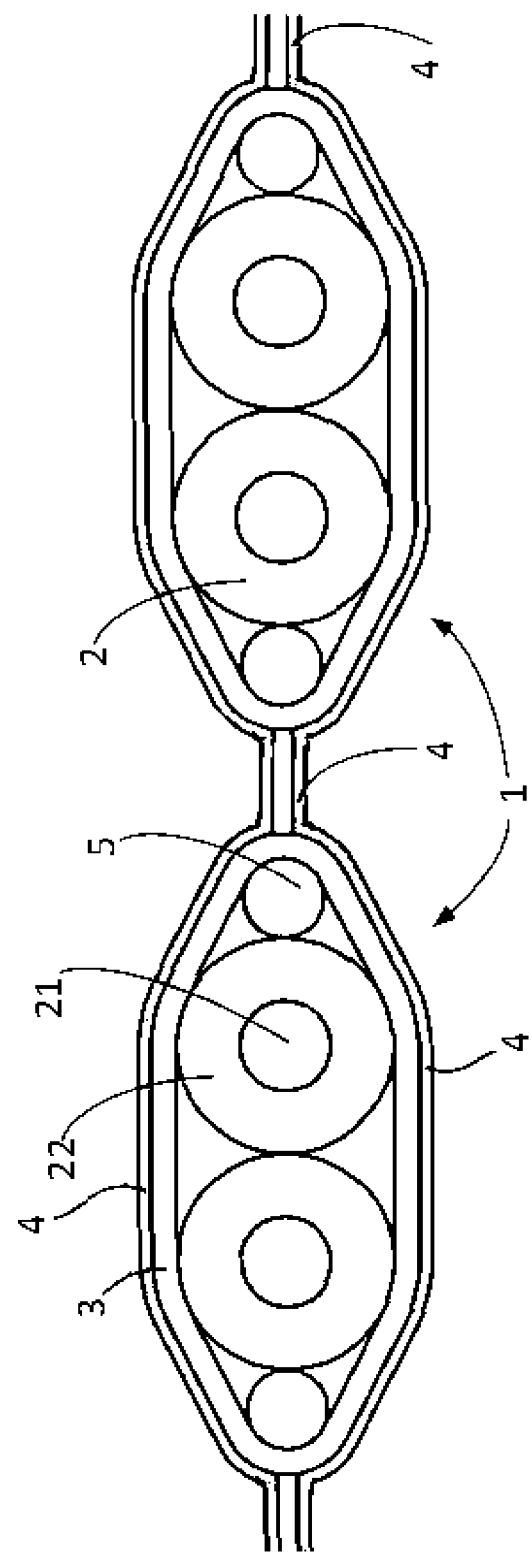
FIG. 3 is a partially enlarged schematic view of the combined cable shown in FIG. 1 and shows two adjacent cable groups.

FIG. 1 is a front view of a combined cable according to an exemplary embodiment of the present disclosure; FIG. 2 is a schematic perspective view of the combined cable shown in FIG. 1; and FIG. 3 is a partially enlarged schematic view of the combined cable shown in FIG. 1 and shows two adjacent cable groups.

As shown in FIG. 1, a combined cable 100 according to the present disclosure includes at least two cable groups 1. Each cable group 1 includes at least one cable 2 arranged side by side. Each cable group further includes an adhesive layer 3 and two coating layers 4. The adhesive layer 3 wraps a periphery of each cable 2 of the at least one cable and the outside of the adhesive layer 3 is provided with adhesion agent. Two coating layers 4 are adhered to the periphery of the adhesive layer 3 of each cable group 1 with the adhesion agent from the upper and lower sides of the at least two cable groups 1, respectively. The coating layers 4 located between two adjacent cable groups 1 are detachably abutted together.

In the combined cable according to the embodiment of the present disclosure, two coating layers 4 serving as the outer layer are adhered to the adhesive layer 3 by the adhesion agent (e.g., hot melt glue) disposed on the outside of the adhesive layer 3, so a flat combined cable 100 with a double-layered film (coating layer) is formed. The coating layer 4 itself does not include the adhesion agent, and the coating layers 4 located between two adjacent cable groups 1 can be detachably abutted together, which can improve the structural stability of the cables in each cable group.

In an exemplary embodiment, the adhesive layer is made of MYLAR material (or PET polyester material). In this way, the adhesive layer 3 is embodied in the form of a wrapped Mylar layer with hot melt glue on its outside, so there are two layers on a microscopic level, that is, a Mylar layer and an adhesion agent layer formed by hot melt glue.

In an exemplary embodiment, two coating layers 4 are adhered to the periphery of the adhesive layer 3 of each cable group 1 by means of thermocompression.

In an exemplary embodiment, a shielding layer includes a polyester tape and a metal layer adhered with the polyester tape, wherein the polyester tape may be on the inside or outside of the metal layer. In an alternative embodiment, the shielding layer includes a polyester tape and conductive particles doped in the polyester tape. In another alternative embodiment, the coating layer 4 is an insulating layer, for example, the coating layer 4 may be a polyester insulating layer.

The two coating layer 4 are attached to the upper and lower surfaces of the adhesive layers 3 wrapping around the cables 2, and then are heat-sealed by flattening, so that the two coating layers 4 are adhered to the adhesive 3, and the two coating layers 4 located between the adjacent two cable groups 1 are detachably abutted together, that is, are not bonded together, thereby the combined cable 100 forms a flat banding cable.

As shown in FIGS. 1-3, in an exemplary embodiment, the cables 2 are electrical power cables. Each electrical power cable includes at least one wire 21 and a protective layer 22 wrapped on the at least one wire 21. The adhesive layer 3 wraps continuously about a perimeter of each cable group 1 and on the periphery of the protective layer 22, such that the adhesive layers of each cable group are discrete and separated from one another. The inner side of the adhesive layer 3 is bonded to the periphery of the protective layer 22 by means of adhesion. That is, the adhesion agent is provided on both the inner side and the outer side of the adhesive layer 3. It can be understood that the adhesive layer 3 can be in direct contact with the periphery of each cable 2 or other layers may be provided between the adhesive layer 3 and the cables 2. As shown in FIG. 3, the coating layers 4 between the cable groups 1 are detached from, and not fixed to, one another, and are separated by a void space.

As shown in FIGS. 1-3, in an exemplary embodiment, at least one group of the cable groups 1 further includes at least one first auxiliary cable 5 wrapped in the adhesive layer 3. For example, the cables 2 can be used as power supply cables and at least one auxiliary cables 5 can be used as signal cable(s). In other embodiments, the cables 2 can be used as signal cables and the at least one auxiliary cable can be used as a power supply cable.

In an exemplary embodiment, the combined cable 100 further includes at least one second auxiliary cable 6 arranged side by side on at least one side of the at least two cable groups 1. The adhesive layer 3 at least partially wraps around the periphery of the at least one second auxiliary cable 6, and the two coating layers 4 are at least partially adhered to the periphery of the adhesive layer 3 wrapping the at least one second auxiliary cable 6, respectively. The at least one second auxiliary cable 6 can be used as signal cable or ground cable.

As shown in FIGS. 1 and 2, in the illustrated embodiment, the combined cable 100 is in a shape of flat, so it can also be referred to a flat cable.

With the combined cable according to the above-mentioned embodiments of the present disclosure, the structural stability can be improved, and the cable wrapped in the adhesive layer is not easy to loosen; the adhesion agent (e.g., hot melt glue) coated on the adhesive layer does not come into contact with the external environment so that it is less affected by the environment and is not easy to fail; and the existing equipment can be used to produce the combined cables, which reduces the cost of production.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A combined cable, comprising:
   at least two cable groups, each comprising at least two adjacent cables with each cable having at least one wire and a protective layer wrapped on the at least one wire, arranged side by side, each cable group further including:
   an adhesive layer wrapping a periphery of the protective layer of the at least two adjacent cables and continuously about a perimeter of each cable group and having adhesion agent located on an outside of the adhesive layer, the adhesive layers wrapping each of the at least two cable groups being discrete and separated from one another, an inner side of the adhesive layer is bonded to the periphery of the protective layer by means of adhesion; and
   two insulating coating layers, respectively adhered to a periphery of the adhesive layer of each cable group with the adhesion agent from upper and lower sides of the at least two cable groups, wherein:
   the coating layers located between the at least two cable groups are detached from one another;
   at least one group of the cable groups further comprises at least one first auxiliary cable, the at least one first auxiliary cable is wrapped in the adhesive layer; and
   each of the two insulating coating layers includes a metal shielding layer.

2. The combined cable according to claim 1, wherein the metal shielding layer includes a polyester tape and a metal layer adhered together.

3. The combined cable according to claim 1, wherein the metal shielding layer includes a polyester tape and conductive particles doped in the polyester tape.

4. The combined cable according to claim 1, wherein the two coating layers are adhered to the periphery of the adhesive layer of each cable group by means of thermo-compression.

5. The combined cable according to claim 1, wherein the combined cable further comprises at least one second auxiliary wire arranged side by side on at least one side of the at least two cable groups.

6. The combined cable according to claim 1, wherein the combined cable is in a shape of flat.

7. The combined cable according to claim 1, wherein the at least two adjacent cables are arranged side by side in a horizontal plane, the horizontal plane defining a plane of symmetry of the cable about which the adhesive layer and the two coating layers are symmetric.

8. The combined cable according to claim 7, wherein an entirety of the combined cable is symmetric about the horizontal plane.

9. The combined cable according to claim 1, wherein the coating layers located between the at least two cable groups are not fixed to one another.

10. The combined cable according to claim 9, wherein the coating layers located between the at least two cable groups extend uniformly and linearly in a first direction between the at least two cable groups.

11. The combined cable according to claim 1, wherein the coating layers located between the at least two cable groups are not laminated to one another.

12. The combined cable according to claim 1, wherein the coating layers located between the at least two cable groups are separated from one another only by a void space, the void space arranged between and separating the respective adhesive layers wrapping each of the at least two cable groups.

13. A cable, comprising:
at least two cable groups arranged side by side in a horizontal plane, each cable group comprising:
at least two adjacent cables;
an adhesive layer wrapping a periphery of the at least two cables and continuously about a perimeter of each cable group and having adhesion agent located on an outside of the adhesive layer, the adhesive layers wrapping each of the at least two cable groups being discrete and separated from one another, the horizontal plane defining a plane of symmetry of the cable about which the adhesive layer is symmetric; and
two insulating coating layers, respectively adhered to a periphery of the adhesive layer of each cable group with the adhesion agent from upper and lower sides of the at least two cable groups, wherein the coating layers located between the at least two cable groups are detached from one another, wherein a first group of the at least two cable groups further comprises a pair of first auxiliary cables wrapped in the adhesive layer.

14. The cable according to claim 13, wherein a second group of the at least two cable groups does not include any auxiliary cables.

15. The cable according to claim 13, further comprising at least one second auxiliary cable arranged on a side of the second group opposite the first group.

16. The cable according to claim 13, wherein the two coating layers are symmetric about the horizontal plane.

17. A combined cable, comprising:
at least two cable groups, each comprising at least two adjacent cables, arranged side by side in a horizontal plane, each cable group further including:
an adhesive layer wrapping a periphery of the at least two adjacent cables and continuously about a perimeter of each cable group and having adhesion agent located on an outside of the adhesive layer, the adhesive layers wrapping each of the at least two cable groups being discrete and separated from one another; and
two insulating coating layers, respectively adhered to a periphery of the adhesive layer of each cable group with the adhesion agent from upper and lower sides of the at least two cable groups, wherein:
the coating layers located between the at least two cable groups are detached from one another;
at least one group of the cable groups further comprises at least one first auxiliary cable, the at least one first auxiliary cable is wrapped in the adhesive layer;
each of the two insulating coating layers includes a metal shielding layer comprising a polyester tape and conductive particles doped in the polyester tape; and
the horizontal plane defines a plane of symmetry of the cable about which the adhesive layer and the two coating layers are symmetric.

* * * * *